«12» United States Patent
Wadekamper et al.

[11] Patent Number: 5,932,930
[45] Date of Patent: *Aug. 3, 1999

[54] METHOD FOR FABRICATING MIXED OXIDE FUEL

[75] Inventors: Donald Clifford Wadekamper, Pleasanton; Ira Nelson Taylor, Jr., Livermore, both of Calif.

[73] Assignee: General Electric Company, Wilmington, N.C.

[*] Notice: This patent is subject to a terminal disclaimer.

[21] Appl. No.: 08/268,085

[22] Filed: Jun. 28, 1994

[51] Int. Cl.⁶ .......................... G21C 21/00; G21C 19/00
[52] U.S. Cl. .......................... 264/0.5; 376/261; 376/419
[58] Field of Search .................. 264/0.5; 376/419, 376/261

[56] References Cited

U.S. PATENT DOCUMENTS

| | | | |
|---|---|---|---|
| 3,917,768 | 11/1975 | Abate-Daga et al. | 264/0.5 |
| 4,247,495 | 1/1981 | Ennerst et al. | 264/0.5 |
| 4,261,934 | 4/1981 | Hart et al. | 264/0.5 |
| 4,264,540 | 4/1981 | Butler | 264/0.5 |
| 4,299,722 | 11/1981 | Stock et al. | 264/0.5 X |
| 4,637,900 | 1/1987 | Frederickson | 264/0.5 X |
| 4,755,332 | 7/1988 | Mizuno et al. | 264/0.5 |
| 4,816,193 | 3/1989 | Peehs et al. | 264/0.5 |

FOREIGN PATENT DOCUMENTS

| | | |
|---|---|---|
| 1240497 | 8/1988 | Canada . |
| 2049034 | 3/1971 | France . |
| 2148174 | 3/1973 | France . |
| 2622343 | 4/1989 | France . |

OTHER PUBLICATIONS

Database WPI, Week 8745, Derwent, AN 87–317706 & JP–A–62 225 993, Oct. 3, 1987, Abstract.
Database WPI, Week 8008, Derwent, AN 80–13995C & JP–A–55 006 267, Jan. 17, 1980, Abstract.

*Primary Examiner*—Peter A. Nelson
*Attorney, Agent, or Firm*—James E. McGinness; Dennis M. Flaherty

[57] ABSTRACT

A process for fabricating weapons-grade plutonium into mixed-oxide fuel for use in a nuclear reactor. The plutonium is converted into plutonia powder at a site remote from the fuel fabrication facility and then the plutonia powder is pressed and fired into high-density plutonia pellets for transport to the fuel fabrication facility. The high-density plutonia pellets serve as a diversion-resistant and environmentally sound method of shipping the plutonia for use as a feed material. Comminution methods are employed to reduce the plutonia pellets to a fine powder for blending with urania feed to produce mixed oxide acceptable for reactor operation.

8 Claims, No Drawings

METHOD FOR FABRICATING MIXED OXIDE FUEL

FIELD OF THE INVENTION

This invention generally relates to fissionable fuel material for use in nuclear reactors. In particular, the invention is directed to an improvement in the process for fabricating mixed-oxide fuel for a nuclear reactor.

BACKGROUND OF THE INVENTION

The need to dispose of plutonium derived from the dismantlement of nuclear weapons is a serious problem. One step which can be taken to alleviate this problem is to recycle weapons-grade plutonium as fuel for a nuclear reactor power plant. This solution requires that the plutonium be transported from the weapons site to the fuel fabrication facility. However, this prospect raises the concern about the best method for plutonium shipment and storage from both the safety and diversion standpoints.

Historically, plutonium has been shipped as the metal, nitrate or oxide. The metal form must be shipped within an inert atmosphere to prevent oxidation. In a postulated accident, the plutonium metal would be difficult to disperse into the environment because of its dense form. However, if the plutonium metal comes into contact with air, it can oxidize or burn and thus form the oxide. The oxide is a fine powder which could be readily dispersed into the environment. Furthermore, plutonium metal is ideal for fabrication of nuclear weapons and is thus highly susceptible as a target for diversion. The nitrate is a liquid which is slightly more resistant to diversion but can be easily dispersed into the environment in the event that the storage container is breached during an accident or act of sabotage. The oxide is generally shipped as a fine powder which is more resistant to diversion than is the liquid nitrate. However, the oxide can also be easily dispersed into the environment if the storage container breaks open during an accident or act of sabotage. Thus, there is a need for a safe and secure method for transporting weapons-grade plutonium to the fuel fabrication facility.

Previous mixed-oxide fuel fabrication has relied on fine plutonia feed powders usually converted from plutonium nitrate solutions to the oxide by direct precipitation processes or as a co-precipitated compound with uranium. These conversion processes result in a very fine powder that is blended with urania to produce mixed-oxide feed material. In some cases, this blended material has been milled by a high-energy process to improve the plutonium dispersion. Statistical sampling and metallographic examination techniques are utilized to qualify each powder blend. One hundred percent inspection techniques are utilized to verify that gross plutonium dispersion did not occur in any portion of a completed fuel rod.

SUMMARY OF THE INVENTION

The present invention is a process for fabricating weapons-grade plutonium into mixed-oxide fuel for use in a nuclear reactor. The plutonium is converted into plutonia powder at a site remote from the fuel fabrication facility and then the plutonia powder is pressed and fired into high-density plutonia pellets for transport to the fuel fabrication facility. Since the pellets are relatively insoluble, it is difficult to separate the plutonium from the high-density pellets which serve as a diversion-resistant and environmentally sound method of shipping the plutonia for use as a feed material.

Plutonia in pellet form provides the greatest fabrication challenge from the standpoint of plutonium homogeneity. Comminution methods must be employed to reduce the plutonia pellets to a fine powder for blending with urania feed to produce mixed oxide acceptable for reactor operation. In this process the plutonia pellets are ground into a fine powder and screened to segregate the fines. The fines are blended with urania to form a mixed-oxide powder blend which can be fabricated into fuel pellets by standard techniques. Since the fine plutonia powder produced by comminution methods does not tend to agglomerate like powder produced by chemical processes, a homogeneous blend of mixed oxide can be more easily produced.

DETAILED DESCRIPTION OF THE PREFERRED EMBODIMENTS

The present invention is a process for fabricating weapons-grade plutonium into mixed-oxide fuel for use in a nuclear reactor. The preferred form of plutonium feed material for processing in the fuel fabrication plant is plutonia, $PuO_2$. Therefore, the metallic weapons-grade plutonium must be converted into ceramic grade plutonia, which is delivered to the site of the fuel fabrication facility. Plutonia made from weapons-grade plutonium is of sufficiently high purity that no further refining to further remove impurities is necessary, with the possible exception of gallium.

There are several alternative methods for converting the plutonium into plutonia: (1) controlled burning of the metal to form the oxide and followed by a mechanical milling step; (2) controlled burning of the metal followed by dissolution and precipitation process steps; and (3) controlled hydriding, dehydriding and oxidation process.

The preferred method for converting plutonium into plutonia is controlled burning and subsequent milling. The potentially reduced activity of plutonia may tend to limit the mixed oxide composition to a maximum of about 10% plutonia and allows pellet densities in the low 90s range. This process provides the lowest cost approach and is expected to produce plutonia which meets the fuel performance requirements for plutonium disposition. If plutonia of higher activity or finer particle size is required, then the second and third alternative processes may be used. However, the hydride-dehydriding process coupled with a controlled oxidation operation would also provide plutonia with higher activity or finer particle size. The hydriding step allows better control of the final oxidation process.

After the plutonium has been converted into plutonia powder, the plutonia powder is pressed into high-density pellets and fired in a sintering furnace for transport to the fuel fabrication facility. Conventional comminution techniques are used to reduce the plutonia pellets to a fine powder for blending with urania powder to produce mixed oxide feed material acceptable for reactor operation. More specifically, the high-density plutonia pellets were broken up and ground to produce a fine powder which does not tend to agglomerate. The plutonia was ground until it passed through a 325 mesh screen (<44 microns). Then urania powder was blended with the ground and sized plutonia to produce a mixed oxide powder blend in accordance with conventional mechanical blending techniques.

The process for fabricating fine plutonia feed powder into oxide fuel pellets has been utilized to fabricate both urania and mixed-oxide fuel for light water reactors, mixed oxide fuel for liquid metal reactors and uranium nitride fuel for space reactor applications. The basic mill-slug-granulate process has been well developed for over 20 years. In this process the feed powders are blended together in the desired concentration, milled to improve inhomogeneity and pre-pressed and granulated to form free-flowing powder for pellet pressing. The resulting pellets are sintered in a reducing atmosphere for 1 to 5 hours at 1600° C. to 1750° C., resulting in pellets which are acceptable from the plutonium homogeneity standpoint. The pellets are then ground to size, inspected and loaded into fuel rods. The fuel rods are sealed by welding, inspected and assembled into fuel bundles. The completed fuel bundles are stored at the fabrication facility until they are needed to provide initial or reload assemblies for a reactor.

The relatively low radioactivity associated with weapons-grade plutonium will allow the fuel fabrication activities to be performed in a glove box arrangement. The requirement for minimized worker exposure is handled by mechanizing all unit processing operations, which will reduce the time the operator is in close proximity to the nuclear material. Also, localized shielding will be installed and lead glass and sheet added as needed to the exterior of the glove boxes.

The feed materials for the fuel fabrication process which utilizes powder blending are the oxide forms of uranium, plutonium and gadolinium. The urania (either natural or depleted) will be supplied as an active powder capable of sintering to high density. The plutonia must meet the requirements of ASTM C757, Nuclear-Grade Plutonium Dioxide Powder, Sinterable.

In the fuel pellet fabrication process the feed oxides are transferred from storage to geometrically safe holding bins. Weight feeders are used to load the appropriate amount of materials into a vibromill where the powders are blended and milled together. The resulting blend is split into as many as eight increments and the subsequent eight increments are cross blended to form a large uniform feed lot of powder. The blend splits are stored in a geometrically safe arrangement and removed for continued processing one at a time. During reblending or cross-blending, each blend split is vibromilled to smooth blend differences and to produce an agglomerated powder for feed to pellet pressing. Small hydraulic pellet presses developed for glove box use are utilized to press pellets. Each press can optionally be provided with multi-cavity dies, depending on the throughput requirements.

The green pellets are loaded into molybdenum sintering boats. Specially designed sinter furnaces with removable refractor sections are utilized to sinter the mixed-oxide pellets. The oxygen atmosphere of the sintering furnace is controlled to obtain fuel pellets of the desired stoichiometry. All of the sintered pellets are passed through a centerless grinding station after inspections for sintering characteristics to control the pressing operations. The grinder has an automatic control feedback loop which will automatically adjust the grinding to maintain the pellet within limits. The column of pellets which exit the grinding operation pass directly to the automated pellet inspection station. At the station, the pellets are inspected and sorted for geometric properties (diameter, length, density, surface finish, cracks and pits). After sampling for chemical characteristics, the pellets are placed into storage to await certification approval for fuel loading. The certified fuel pellets are aligned into columns, where final column geometry is obtained prior to loading into fuel cladding (tubes with one end plug welded in place).

We claim:

1. A method for fabricating mixed-oxide fuel, comprising the steps of:
    (a) pressing plutonia powder into the shape of a pellet;
    (b) firing said pressed powder to form a sintered plutonia pellet:
    (c) breaking up said sintered plutonia pellet into pieces;
    (d) grinding said pieces into plutonia powder;
    (e) segregating fine particles of plutonia from said plutonia powder to form a fine plutonia powder; and
    (f) blending said fine plutonia powder with urania powder.

2. The method as defined in claim 1, further comprising the steps of:
    blending a first predetermined amount of said fine plutonia powder with a second predetermined amount of said urania powder; and
    vibromilling said blended plutonia and urania powders to form a homogeneous mixed-oxide powder.

3. The method as defined in claim 2, further comprising the steps of:
    pressing said vibromilled mixed-oxide powder into the shape of a pellet; and
    sintering said pellet in a reducing atmosphere.

4. The method as defined in claim 3, wherein said pellet is sintered for 1 to 5 hours at 1600° C. to 1750° C.

5. The method as defined in claim 1, wherein said segregated fine particles of plutonia have a size less than 44 microns.

6. The method as defined in claim 2, wherein said blending step further includes blending a third predetermined amount of gadolinia powder with said first predetermined amount of plutonia powder and said second predetermined amount of urania powder.

7. The method as defined in claim 1, further comprising the step of:
    (g) converting plutonium metal into plutonia powder prior to said step (a).

8. The method as defined in claim 7, wherein steps (g), (a) and (b) are performed at a remote site and steps (c) through (f) are performed at a fuel fabrication facility, further comprising the step of transporting said sintered plutonia pellet from said remote site to said fuel fabrication facility.

* * * * *